United States Patent
Kitamura et al.

(10) Patent No.: US 6,461,768 B1
(45) Date of Patent: Oct. 8, 2002

(54) NEGATIVE ELECTRODE MATERIAL CONTAINING BISMUTH-COATED ZINC POWDER PARTICLES FOR USE IN ALKALINE CELL

(75) Inventors: Toshiya Kitamura, Akita (JP); Masayoshi Matsumoto, Yokohama (JP); Mikio Hashimoto, Minami-Akita-gun (JP)

(73) Assignee: Dowa Mining Co., Ltd., Tokyo (JP)

( * ) Notice: Subject to any disclaimer, the term of this patent is extended or adjusted under 35 U.S.C. 154(b) by 0 days.

(21) Appl. No.: 09/541,942

(22) Filed: Apr. 3, 2000

(30) Foreign Application Priority Data

Jun. 8, 1999 (JP) .......................... 11-197970
Dec. 8, 1999 (JP) .......................... 11-376439

(51) Int. Cl.[7] .......................... H01M 4/12; H01M 4/42; H01M 4/38
(52) U.S. Cl. .......................... 429/229
(58) Field of Search ............... 429/229, 230, 429/231

(56) References Cited

FOREIGN PATENT DOCUMENTS

| JP | 61-131365 A2 | * | 6/1986 |
| JP | 7-54705 | | 2/1993 |
| JP | 5-151968 A | * | 6/1993 |
| JP | 5-299082 | | 11/1993 |
| JP | 10-40926 | | 2/1998 |

* cited by examiner

Primary Examiner—Stephen Kalafut
Assistant Examiner—Susy Tsang-Foster
(74) Attorney, Agent, or Firm—Frishauf, Holtz, Goodman & Chick, P.C.

(57) ABSTRACT

A negative electrode material for use in an alkaline cell. The negative electrode material comprising bismuth-coated zinc powder particles containing at least one element selected from the group consisting of Al, Bi and In. The zinc or zinc alloy powder preferably has a particle size within the range of 10 μm to 1000 μm. The bismuth-coated zinc powder particles are obtained by immersing a mixture of a zinc powder and a metallic bismuth powder in an aqueous alkaline solution to deposit bismuth on surfaces of the zinc powder particles by displacement.

34 Claims, 7 Drawing Sheets

Fig. 3
(EXAMPLES 3, 7, 9 AND 11)

Fig. 4
(EXAMPLES 4, 8, 10 AND 12)

ADDITION EFFECTS OF Bi, $Bi_2O_3$ TO (4N-Zn POWDERS)

Fig. 7

ADDITION EFFECTS OF Bi, $Bi_2O_3$ TO (Al30-Bi40-In300 POWDERS)

NEGATIVE ELECTRODE MATERIAL CONTAINING BISMUTH-COATED ZINC POWDER PARTICLES FOR USE IN ALKALINE CELL

BACKGROUND OF THE INVENTION

The present invention relates to zinc powders coated with bismuth which are advantageous as negative electrode materials for use in alkaline cells and a method of preparing the same.

Zinc has favorably been used as a negative electrode material for use in a cell since it has an appropriate potential when used as a negative electrode in an aqueous solution system, as well as it is low-priced. However, its corrosion potential is more base than the decomposition potential of water so that, when it contacts an electrolyte, it evolves a hydrogen gas. Therefore, a method has conventionally been dominantly performed that suppresses a gas evolution amount by raising hydrogen overvoltage through usage of amalgamated zinc which is prepared by adding mercury to zinc.

However, the mercury contained in the cell has caused an environmental pollution problem. Recent studies of zinc powders to be used as a negative electrode have been directed to the development of a mercury-free zinc alloy which can substitute for amalgamated zinc and to the suppression of hydrogen gas evolution by the use of such mercury-free zinc alloy. In connection with this development, various attempts have been made inclusive of the selection of an optimal zinc alloy composition, the surface treatment of zinc particles, the selection of an optimal electrolyte composition, the addition of a corrosion inhibitor to the electrolyte or the like. Particularly, a zinc alloy containing one or more elemental components selected from the group consisting of Al, Bi, In, Ga, Sn, Pb and the like was employed as a negative electrode material to provide a mercury-free alkaline cell in which the compositional ratio of these alloying elements was rendered optimal in suppressing the hydrogen gas evolution (see Japanese Unexamined Patent Publications (Kokai) No. 299082/1993, No. 40926/1998 and Japanese Examined Patent Publication (Kokoku) No. 54705/1995).

However, from the standpoint of safety in terms of preventing liquid leakage or burst of the cell to be caused by the hydrogen gas evolution, the development of a zinc powder for use as a negative electrode material capable of further suppressing the hydrogen gas evolution is a principal problem basically inherent in a cell which employs an alkaline electrolyte. Particularly, since the hydrogen gas evolution has not been sufficiently suppressed in a button-typed cell which uses zinc powders having a small average particle size and large relative surface areas, it is a current situation that a few % by weight of amalgamated zinc powders must be used.

SUMMARY OF THE INVENTION

Accordingly, an object of the present invention is to provide a negative electrode material for use in an alkaline cell capable of reducing the amount of a hydrogen gas which evolves from the cell. Another object of the present invention is to provide a cell which is low in the hydrogen gas evolution amount.

The present inventors have conducted intensive studies in order to solve the aforementioned problems of the prior art and have found that the hydrogen gas evolution amount can be remarkably reduced by employing a zinc powder all the particles of which are surface-coated with a homogeneous coating film consisting of bismuth, said zinc particles having a size within the range of 10 to 1000 μm which is a commonly employed size range in connection with powders for use in the cell. The present inventors have also found the below-mentioned unexpected phenomenon which has enabled them to develop a novel method capable of preparing bismuth-coated zinc particles easily and at low cost. Namely, they have found that a substantial quantity of bismuth or bismuth oxide, which has heretofore been considered to be insoluble in an aqueous alkaline solution, dissolves therein and that the resultant dissolved bismuth in the aqueous alkaline solution performs displacement reaction with surfaces of zinc particles added therein to allow the surfaces of zinc particles to be coated with bismuth. Moreover, the present inventors have attained the present invention based on the finding that the uniform bismuth-coating films can be formed on the surfaces of zinc particles having a particle size range employable as a powder for use in a cell by adopting a step in which a bismuth powder and/or a bismuth oxide powder is dry mixed with a zinc powder and then the resultant mixture is immersed in an aqueous alkaline solution.

In accordance with one aspect of the present invention, there is provided a negative electrode material for use in an alkaline cell, said material comprising a powder consisting of bismuth-coated zinc particles which has been prepared by coating the surfaces of the zinc particles with bismuth and/or bismuth oxide.

In accordance with another aspect of the present invention, there is provided a negative electrode material as described above, in which said zinc powder is a zinc alloy powder.

In accordance with a further aspect of the present invention, there is provided an alkaline cell as described above, in which the zinc alloy powder contains at least one element selected from the group consisting of Al, Bi and In.

In accordance with a still further aspect of the present invention, there is provided a negative electrode material as described above, in which the bismuth-coated zinc powder consists of zinc particles having a particle size in the range of 10 to 1000 μm.

In accordance with a still further aspect of the present invention, there is provided an alkaline cell characterized by having employed therein a negative electrode material as described above.

In accordance with a still further aspect of the present invention, there is provided a method of preparing a negative electrode material for use in an alkali cell, in which the bismuth-coated zinc powder can be prepared by a method comprising the steps of: dry mixing a zinc powder with a metallic bismuth powder previously; immersing the resultant mixed powder in an aqueous alkaline solution; and depositing by displacement the resultant dissolved bismuth on the surfaces of the zinc powder particles.

In accordance with another aspect of the present invention, there is provided a method of preparing a negative electrode material for use in an alkali cell, in which a bismuth-coated zinc powder can be prepared by a method comprising the steps of: dry mixing a zinc powder with a bismuth compound powder previously; immersing the resultant mixed powder in an aqueous alkaline solution; and depositing by displacement the resultant dissolved bismuth on the surfaces of the zinc powder particles.

In accordance with another aspect of the present invention, there is provided a method of preparing a negative electrode material as described above, in which the bismuth compound powder comprises a bismuth oxide powder.

In accordance with the other aspect of the present invention, there is provided a method of preparing the negative electrode material as described above, in which the zinc powder comprises a zinc alloy powder.

BRIEF DESCRIPTION OF THE DRAWINGS

The features of the present invention that are believed to be novel are set forth with particularity in the appended claims. The invention, together with objects and advantages thereof may best be understood by reference to the following description of the presently preferred embodiments together with the accompanying drawings in which:

DETAILED DESCRIPTION OF THE INVENTION

The bismuth-coated zinc powder according to the present invention shows, upon being used as a negative electrode active material for an alkaline cell, substantially improved ability of suppressing the evolution of a hydrogen gas which ability has heretofore been required by non-amalgamated zinc powders.

Targeted material powders to be coated with bismuth can be pure zinc powders. However, the amount of hydrogen gas evolution amount is substantially reduced by using a zinc alloy powder, particularly, zinc alloy powders having contained therein one or more elements selected from the group consisting of Al, Bi and In.

The bismuth-coated zinc powders according to the invention can stably suppress the hydrogen gas evolution, when they are produced with particle size in the range of 10 to 1000 $\mu$m, preferably 200 to 1000 $\mu$m, and more preferably 200 to 800 $\mu$m, which are the particle size ranges usually utilized for zinc powders for use in cells.

It has been considered that metallic bismuth and bismuth oxide scarcely dissolve in an aqueous alkaline solution. However, it has been found that as described in Examples 1 and 2, both metallic bismuth and bismuth oxide substantially dissolve in an aqueous alkaline solution in accordance with the reaction formulae (1) and (2) as follows:

$$2Bi + 3/2O_2 + 6OH^- \rightarrow 2BiO_3^{3-} + 3H_2O \qquad (1)$$

$$Bi_2O_3 + 6OH^- \rightarrow 2BiO_3^{3-} + 3H_2O \qquad (2)$$

When a zinc powder is added to the above bismuth solution, the bismuth concentration in the solution decreases and the deposition of bismuth can be observed by naked eyes. From these phenomena, it is considered that the following deposition reaction due to the reduction of bismuth by zinc proceeds:

$$3Zn + 2\ BiO_3^{3-} \rightarrow 3ZnO_2^{2-} + 2Bi\downarrow \qquad (3)$$

However, if the zinc powder is simply added to the bismuth solution, the deposition of bismuth occurs only locally. Thus, it is impossible to form uniform bismuth coatings on the surfaces of zinc particles.

According to the specific manner of the present invention, a zinc powder and a bismuth compound powder such as metallic bismuth powder and/or a bismuth oxide powder are previously fully dry mixed before the resultant mixed powder is added to an aqueous alkaline solution. By such addition of the mixed powder, a slight amount of bismuth dissolves in the solution and the thus dissolved bismuth rapidly deposits on the surfaces of zinc particles. In this case, since the bismuth component is contained dispersed through the whole of the mixed powder, bismuth does not segregate on a specific part of the zinc powder and the bismuth-coated zinc powder with bismuth being uniformly deposited on the surface of the zinc particles is obtained.

Moreover, the bismuth component contained in the aforementioned mixed powder, particularly, when it is metallic bismuth and/or bismuth oxide does not contain any anions such as a chlorine ion, a nitrate ion, a sulfate ion or the like. Thus, an electrolyte prepared by using the above mentioned mixed powder will be free from such anions, and therefore, there is a merit that it is not necessary to take into consideration an influence of such anions to cell characteristics.

The mechanism of suppressing hydrogen gas evolution by the thus obtained bismuth-coated zinc powder has not yet been clarified, but is considered to be as follows:

Generally, the reaction of hydrogen gas evolution by zinc is considered as follows:

$$Zn + 2H_2O + 2OH^- = Zn(OH)_4^{2-} + H_2\downarrow \qquad (4)$$

The $Zn(OH)_4^{2-}$ ion produced in the above formula (4) undergoes further reactions represented by the following formulae (5) and (6) as the concentration thereof goes higher:

$$Zn(OH)_4^{2-} \rightarrow Zn(OH)_2 \rightarrow ZnO$$

Namely, $$Zn(OH)_4^{2-} \rightarrow Zn(OH)_2 + 2OH^- \quad (5)$$

$$Zn(OH)_2 \rightarrow ZnO + H_2O \quad (6)$$

The coating thus formed over the surface of a zinc particle has a continuous composition of $Zn/ZnO/Zn(OH)_2/Zn(OH)_4^{2-}$ in this order from the side of zinc toward the side of the electrolyte.

Since the $Zn(OH)_2$ coating thus obtained is of a porous sedimentation coating, he ZnO coating basically plays an important role as an anti-corrosive coating. It is considered that in fact a very thin ZnO coating is formed when zinc contacts an electrolyte and the gas evolution reaction shown in formula (4) proceeds by the reaction of the electrolyte and Zn which has moved through the ZnO coating to the site that is in contact with the electrolyte.

ZnO is a non-stoichiometric compound of Zn-excessive type illustrated by $Zn_{1+\alpha}O$ in which an excess amount of Zn exists as interstitial ions.

The more the amount of interstitial ions of zinc, the more the amount of Zn which moves through the ZnO coating to the surface where it contacts the electrolyte and the more the amount of the hydrogen gas evolution according to the formula (4).

The interstitial zinc ion, i.e., $Zn_{i'}$, is produced by the reactions according to the following formulae (7) and (8) (indicated by Kroeger-Vink method):

$$ZnO = Zn_{i'} + e^- + \tfrac{1}{2}O_2 \quad (7)$$

Equilibrium constant (K) is shown as follows:

$$K_r = [Zn_{i'}] \cdot [e^-] \cdot P_{O_2}^{1/2} \quad (8)$$

It is considered that $P_{O_2}$ is constant in this case so that formula (8) can be restated as follows:

$$K_r' = [Zn_{i'}] \cdot [e^-] \quad (9)$$

If a portion of Zn site of ZnO is replaced by a trivalent ion, i.e., $Bi^{3+}$, to form a solid solution at this point, the following reaction occurs:

$$Bi_2O_3 = 2Bi_{zn} + 2e^- + 2O_0 + \tfrac{1}{2}O_2 \quad (10)$$

Since electrons, i.e., $e^-$, are supplied by the reaction shown in the formula (10), the reaction shown in formula (7) proceeds leftward based on the formula (9) whereupon the amount of interstitial Zn ions, namely, $Zn_{i'}$, decreases. Ion species which moves in the coating is this interstitial Zn ion, $Zn_{i'}$, so that the decrease of the amount of $Zn_{i'}$ leads to the decrease of the amount of Zn which moves up to the surface where the zinc particles contacts the electrolyte. As a result, the reaction of zinc corrosion (which is equal to hydrogen gas evolution reaction) according to formula (4) is suppressed. Moreover, since the electron as a conductive carrier, $e^-$, is doped into the ZnO coating, the electrical conductivity of the surface of zinc particles is enhanced. Thus, when it is used in a cell, the resistance inside the cell is effectively decreased. Bismuth-coated zinc powders can also be prepared by a wet method comprising the steps of: putting a zinc powder into a reaction tank followed by agitation; adding gradually a small amount of an aqueous solution of bismuth salt compound such as bismuth nitrate, bismuth sulfate, bismuth chloride or the like; and bringing about the deposition of bismuth by displacement on the surface of a zinc particle. However, this type of wet method requires the steps such as filtration, dehydration, drying or the like which lead to a more complicated production operation than the above-described dry method. In addition, in order to form a homogeneous Bi layer on the surface of a zinc particle by the above-described wet method, it is necessary to set various conditions in detail such as temperature, concentration, stirring, addition rate and so forth. Accordingly, the method is preferred where a zinc powder is dry mixed with bismuth and/or bismuth oxide and then the thus prepared mixture is immersed in an aqueous alkaline solution.

EXAMPLES

Examples and Comparative Examples are provided below for the purpose of further illustrating the present invention, but are in no way to be taken as limiting it and also the alloyed zinc powder composition and the mixed metallic powders according to the present invention are by no means limited to those employed in the illustrated Examples and Comparative Examples. Unless otherwise stated, all parts and percentages are herein given by weight.

Example 1

Solutions each prepared by adding 1 g of a metallic bismuth powder (available from Dowa High-Tech Co.) to 20 g of an aqueous 40% KOH solution used as an electrolyte were permitted to stand at each of the temperatures of 20° C., 45° C., and 60° C. for 1 to 3 days to prepare samples. A supernatant KOH solution was taken out of each sample to determine bismuth dissolved therein by the atomic absorption method.

Figure 1:
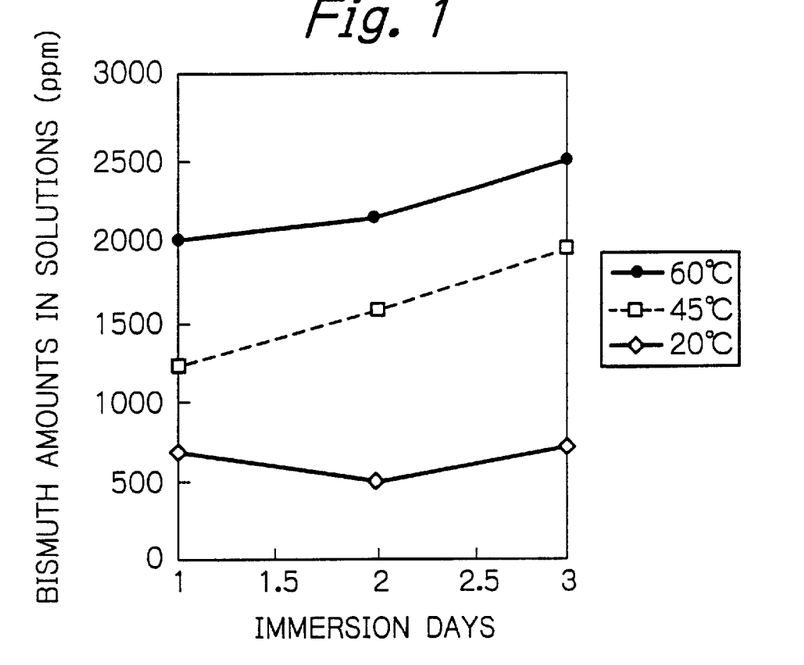
FIG. 1 is a graph showing the relationships between the number of days for which metallic bismuth is immersed in an aqueous KOH solution at a constant temperature and the amount of bismuth dissolved in the solution according to the results obtained in the examples of the present invention.

FIG. 1 shows a change of bismuth amounts dissolved in each solution (dissolved bismuth amounts) relative to immersion days at each temperature. It became apparent from the results shown in FIG. 1 that the higher the temperature of the solution the higher the solubility of bismuth and that a considerable amount of bismuth dissolves in an aqueous KOH solution at any temperatures.

Example 2

The same procedures as in Example 1 were repeated except that 1 g of the powder of bismuth oxide (available from Dowa High-Tech Co.) was added to 20 g of aqueous 40% KOH solution used as an electrolyte. Thus, the bismuth amount dissolved in each of the aqueous KOH solutions was determined.

Figure 2:
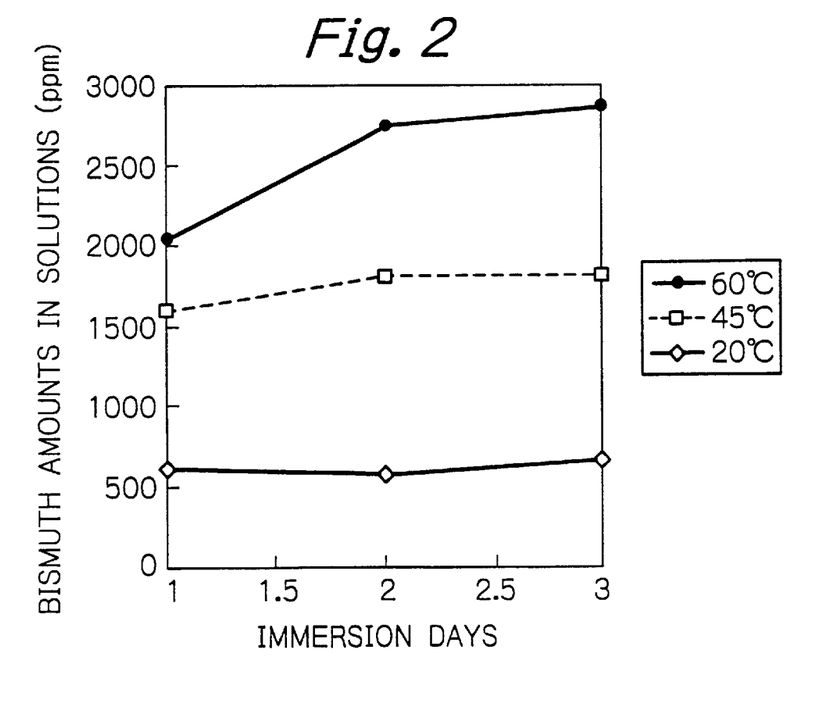
FIG. 2 is a graph showing the relationship between the number of days for which bismuth oxide is immersed in an aqueous KOH solution at different temperatures and the amount of bismuth dissolved in the solution as results of embodiments of the present invention.

FIG. 2 shows a change of bismuth amounts dissolved in each solution (dissolved bismuth amounts) relative to immersion days at each temperature. It became apparent from the results shown in FIG. 2 that the higher the temperature of the solution the higher the solubility of bismuth oxide and that a considerable amount of bismuth oxide dissolves in an aqueous KOH solution at any temperatures.

Example 3

A powder of high purity zinc having a particle size in the range of 38 to 850 μm and having a 4N (four-nine) purity (99.99%) was classified by sieves to ten sorted portions as samples of zinc powder. A powder of metallic bismuth was dry mixed with each of the classified portions at a proportion of 600 ppm to prepare mixed zinc powders.

An amount of 5 g each of the thus prepared mixed zinc powders was added to 15 g of an electrolyte which was previously prepared by adding ZnO to an aqueous 40% KOH solution at a proportion of 3%. The resulting mixture was permitted to stand at 60° C. for 3 days before measuring the amount of gas evolution to thereby determine the average gas evolution amount ($\mu$l/g·day).

Figure 3:
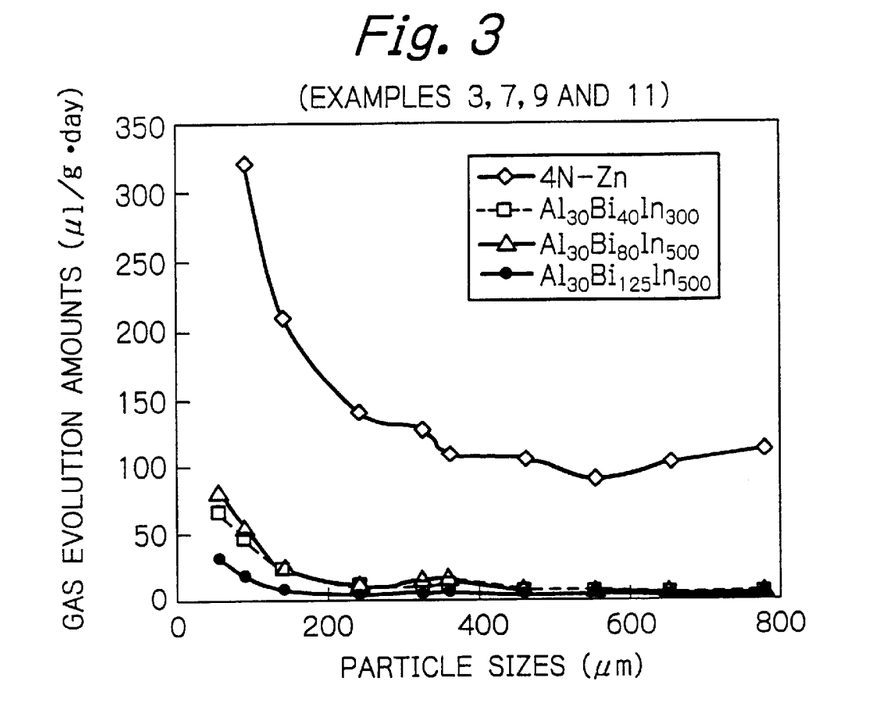
FIG. 3 is a graph showing the relationship between the particle size of metallic bismuth-mixed zinc powder according to different material zinc composition and the amount of gas evolution in an aqueous KOH solution as results of embodiments of the present invention.

Obtained results are shown in Table 1 and also in a graph in FIG. 3.

TABLE 1

| Particle Size Ranges ($\mu$m) | Average Particle Sizes ($\mu$m) | Average Gas Evolution Amounts ($\mu$l/g . day) Composition: 4 N (99.99%) Zn | | |
|---|---|---|---|---|
| | | Non-Addition (Comparative Example 1) | Bi Addition (Example 3) | Bi$_2$O$_3$ Addition (Example 4) |
| 850–710 | 780 | 149.3 | 111.2 | 49.7 |
| 710–600 | 655 | 150.7 | 101.5 | 51.8 |
| 600–500 | 550 | 154.0 | 89.7 | 39.3 |
| 500–425 | 463 | 166.7 | 104.3 | 46.0 |
| 425–350 | 363 | 176.5 | 107.7 | 40.2 |
| 350–300 | 325 | 189.2 | 125.3 | 47.3 |
| 300–180 | 240 | 215.3 | 139.6 | 41.1 |
| 180–106 | 143 | 290.4 | 208.9 | 76.7 |
| 106–75 | 91 | 404.5 | 320.8 | 131.7 |
| 75–38 | 57 | 534.9 | — | — |

Example 4

A powder of bismuth oxide was dry mixed at a proportion of 100 ppm with each of zinc powder samples prepared by the same classifying method as in Example 3 to prepare mixed zinc powders. The amounts of gas evolution of the thus prepared mixed zinc powders were measured in the same way as in Example 3 except for the procedures referred to above.

Figure 4:
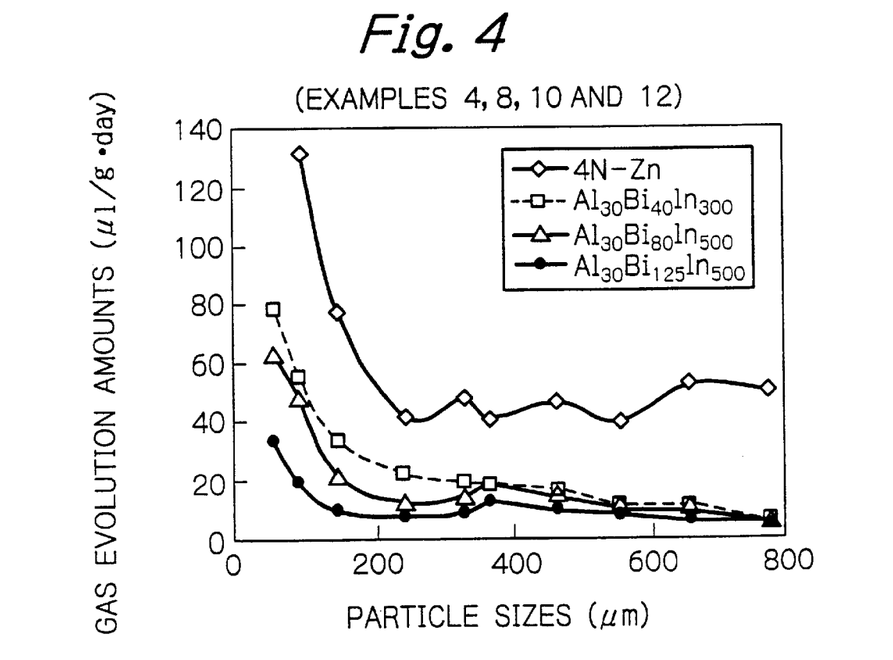
FIG. 4 is a graph showing the relationship between the particle size of bismuth oxide-mixed zinc powder according to different material zinc compositions and the amount of gas evolution in an aqueous KOH solution as results of embodiments of the present invention.

The results are simultaneously shown in Table 1 and also by the graph in FIG. 4.

Comparative Example 1

Average gas evolution amounts of respective zinc powder samples prepared in the same classifying way by sieves as in Example 3 were measured in the same way as in Example 3 except that no bismuth was added.

Figure 5:
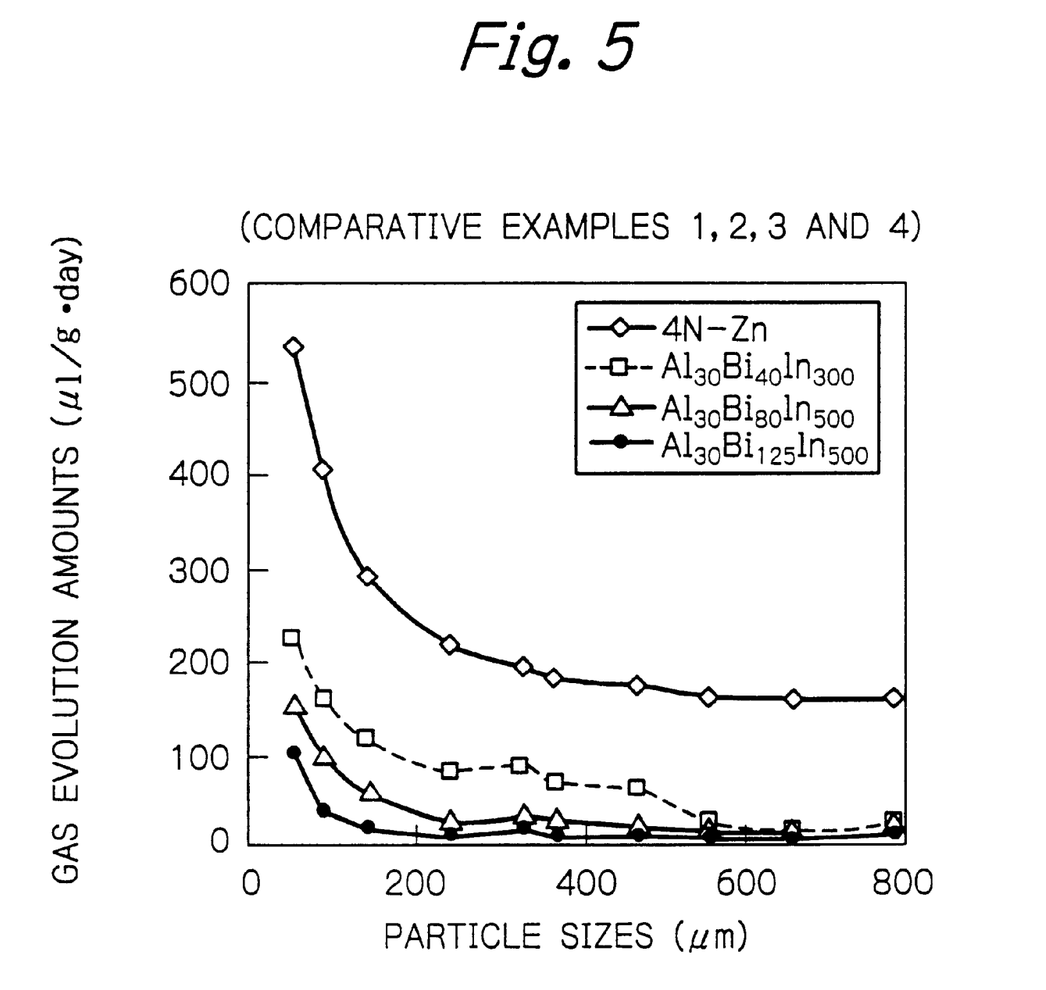
FIG. 5 is a graph showing the relationship between particle size of zinc powder not mixed with bismuth according to different zinc compositions and the amount of gas evolution in an aqueous KOH solution as results of embodiments of the present invention.
Figure 6:
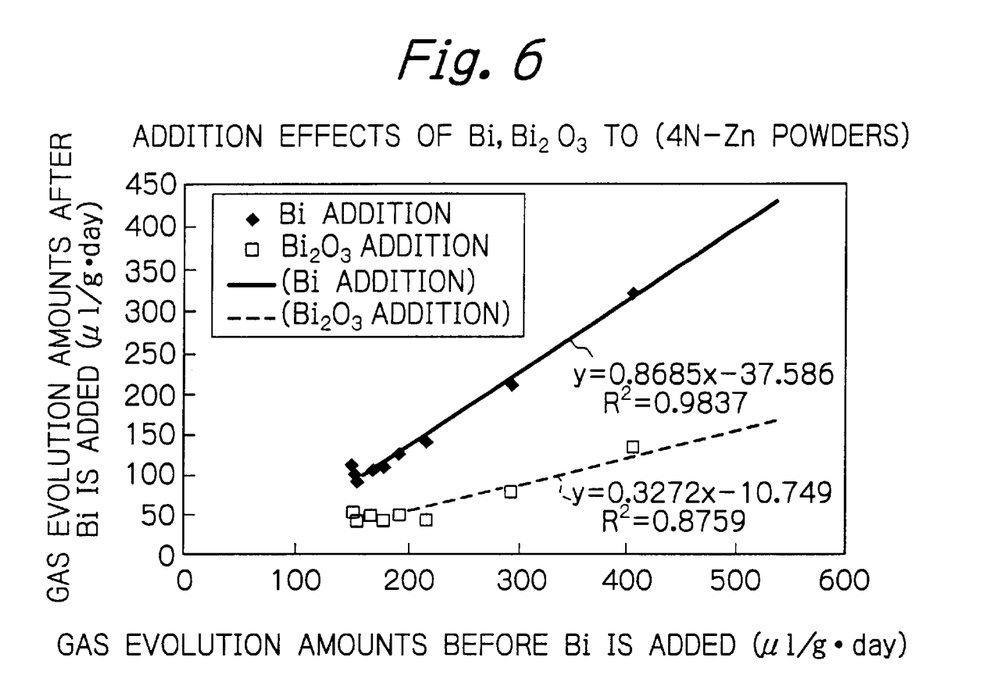
FIG. 6 is a graph showing the relationship between the amounts of gas evolution in pure zinc powders before and after Bi is added thereto in Table 1 based on Examples and Comparative Examples of the present invention.
Figure 7:
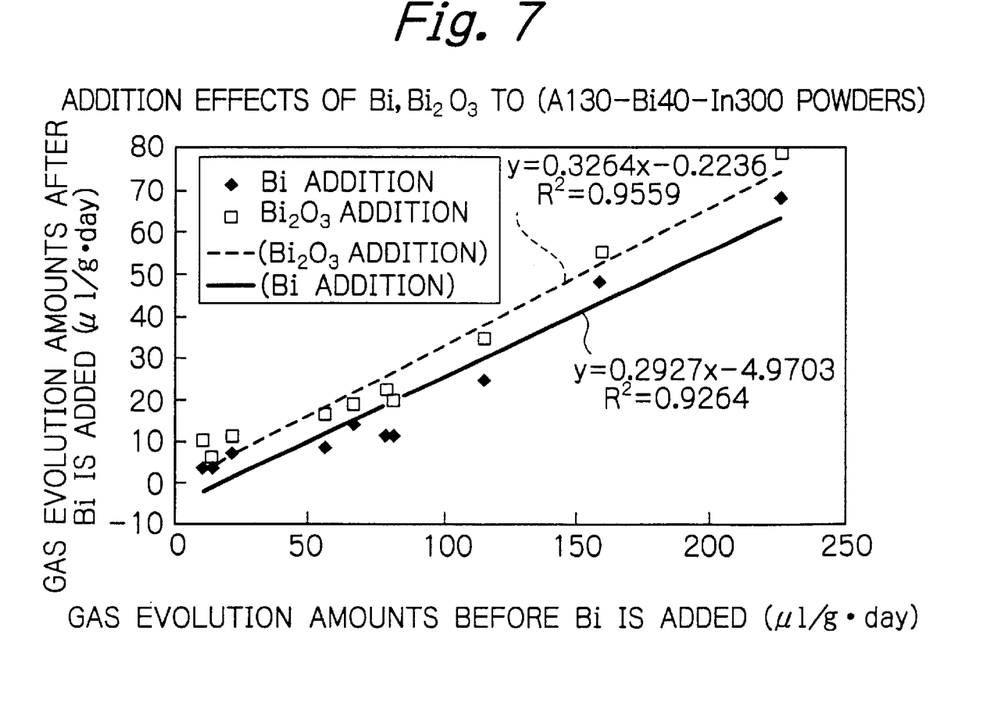
FIG. 7 is a graph showing the relationship between the amounts of gas evolution in zinc alloy powders before and after Bi is added thereto in Table 2 based on Examples and Comparative Examples of the present invention.
Figure 8:
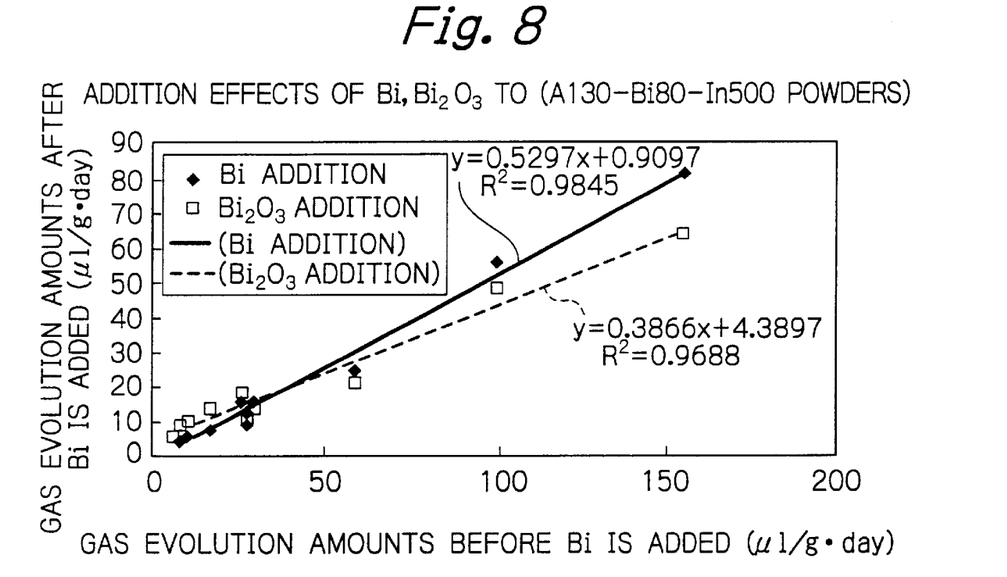
FIG. 8 is a graph showing the relationship between the amounts of gas evolution in zinc alloy powders before and after Bi is added thereto in Table 3 based on Examples and Comparative Examples of the present invention.
Figure 9:
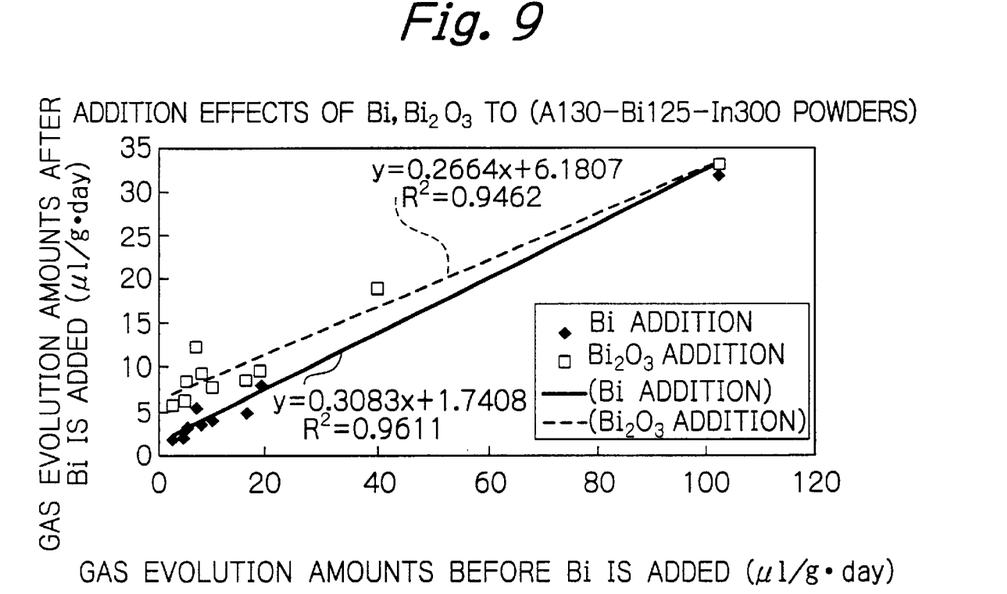
FIG. 9 is a graph showing the relationship between the amounts of gas evolution in zinc alloy powders before and after Bi is added thereto in Table 4 based on Examples and Comparative Examples of the present invention.

Obtained results are additionally shown in Table 1 and also in a graph in FIG. 5.

In any case of Example 3, Example 4 and Comparative Example 1 wherein pure zinc with 4N purity was employed as a material powder, one could find a tendency that the gas evolution decreased as the particle size became larger. This result is compatible with the fact that a specific surface area decreases as a particle size increases.

In the case of Example 3 in which a mixture of a zinc powder and a metallic bismuth powder was used, one could observe the decreased amount of gas evolution than in the case of Comparative Example 1 in which a zinc powder having no bismuth added thereto was used. In the case of Example 4 in which a mixed zinc powder having contained therein a bismuth oxide powder was employed, the decrease of a hydrogen gas evolution was more remarkable than in the case of Example 3.

As shown above, it was confirmed that the effect of bismuth coating was exhibited by all the particles of the zinc powder.

Example 5

Figure 10:
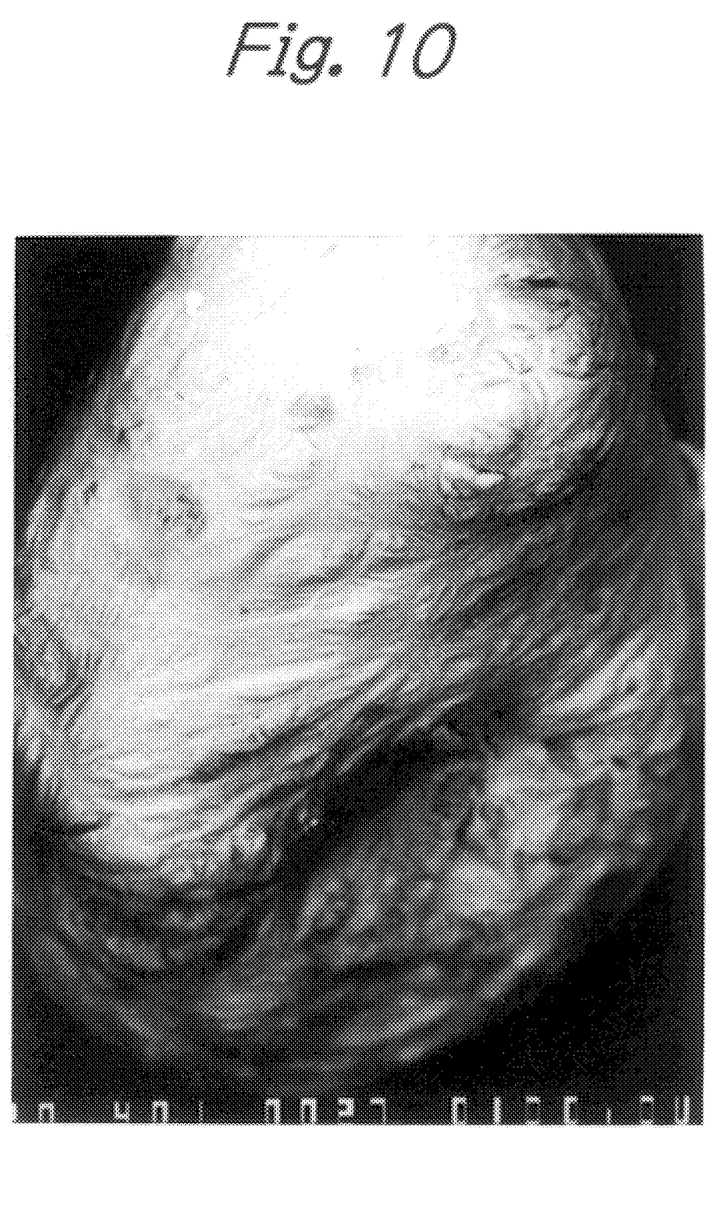
FIG. 10 is a photomicrograph showing a particle structure of a bismuth-coated zinc powder according to the present invention.
Figure 11:
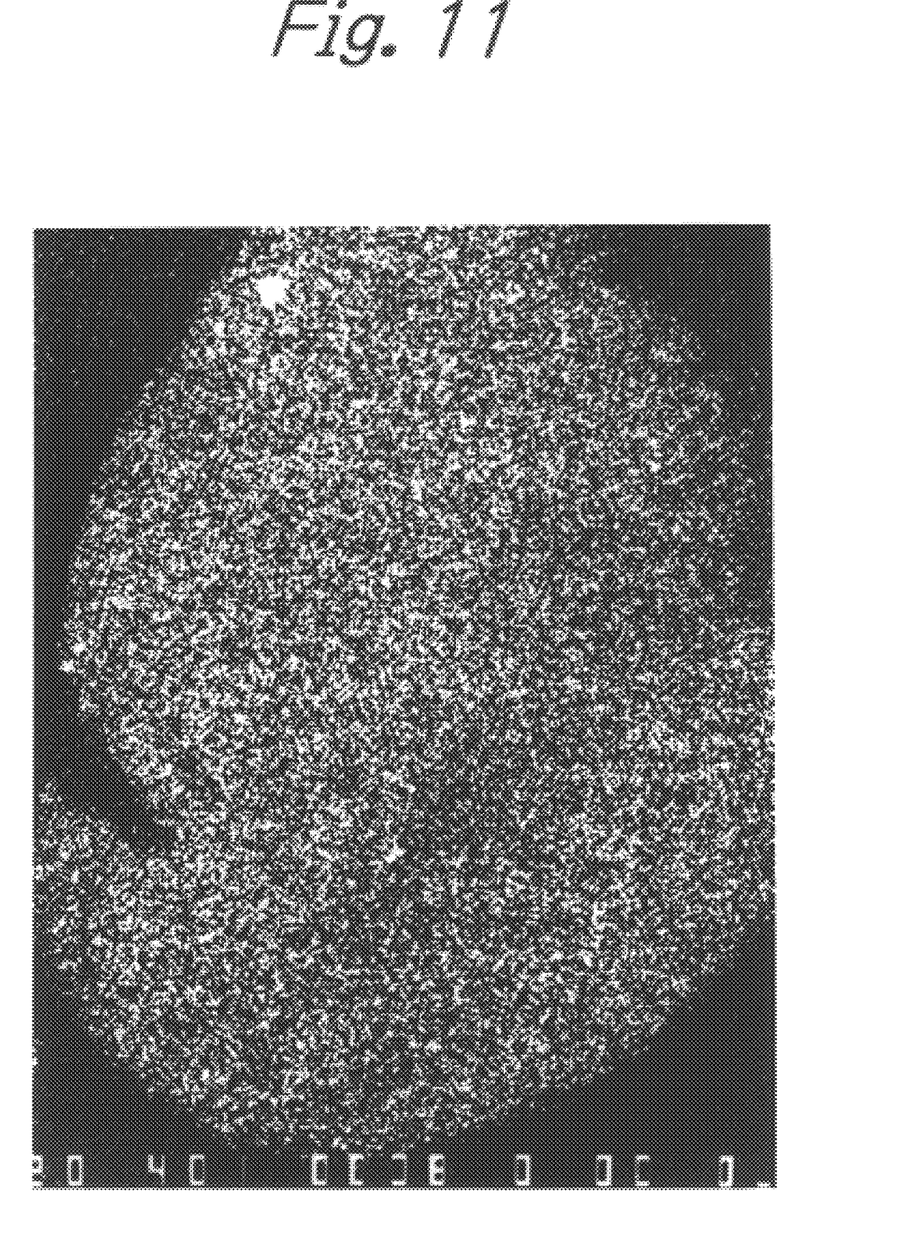
FIG. 11 is an X-ray photograph showing a bismuth distribution on a particle surface of a bismuth-coated zinc powder according to the present invention.

The mixed zinc powder (4N purity zinc powder having admixed therewith 600 ppm of metallic bismuth) employed in Example 3 was immersed in the same electrolyte as prepared in Example 3 at 60° C. for one day before the surface of the zinc powder was observed by an X-ray photograph or the like. FIG. 10 is a microphotograph (by SEM: scanning electron microscope) showing the structure of a zinc particle; FIG. 11 is an X-ray photograph (by EPMA: electron probe microanalyzer) showing the distribution state of bismuth (seen in white dots in the photograph) existing on the surface of a zinc powder particle. From the bismuth distribution photograph of FIG. 11, it was observed that bismuth (seen in white dots in the photograph) existed uniformly distributed all over the surface of each of the zinc particle.

Example 6

The mixed zinc powder employed in Example 4 (4N purity zinc powder having admixed therewith 100 ppm of bismuth oxide) was also observed by the ray photograph (by EPMA) in the same manner as in Example 5. It was confirmed (though not shown by a photograph) that bismuth was uniformly distributed all over the surface of each of the zinc powder particles. As would be appreciated from the above description, it was confirmed that bismuth coating was formed on all over the surface of each of the zinc powder particles, in whichever of the cases wherein, the mixed zinc powder comprising metallic bismuth or the one comprising bismuth oxide was employed as a sample.

Example 7

A zinc alloy powder having a particle size in the range of 38 to 850 $\mu$m and having a composition comprising 30 ppm of Al, 40 ppm of Bi, 300 ppm of In and the rest of zinc was classified by sieves to prepare ten different samples of the zinc alloy powder. Then, a metallic bismuth powder was dry mixed with each of the thus prepared samples at a proportion of 600 ppm bismuth based on the weight of the resulting mixture.

An average gas evolution amount of each of the thus prepared mixed zinc alloy powders was measured in the same manner as in Example 3.

Obtained results are also shown with the other results in Table 2 and by the graph shown in a graph in FIG. 3.

TABLE 2

| Particle Size Ranges ($\mu$m) | Average Particle Sizes ($\mu$m) | Average Gas Evolution Amounts ($\mu$l/g . day) Composition: Al 30-Bi 40-In 300 Zn (ppm) | | |
|---|---|---|---|---|
| | | Non-Addition (Comparative Example 2) | Bi Addition (Example 7) | Bi$_2$O$_3$ Addition (Example 8) |
| 850–710 | 780 | 14.0 | 3.5 | 6.2 |
| 710–600 | 655 | 10.3 | 3.3 | 10.2 |
| 600–500 | 550 | 21.3 | 7.1 | 11.0 |
| 500–425 | 463 | 56.3 | 8.0 | 16.0 |
| 425–350 | 363 | 66.9 | 13.5 | 18.2 |
| 350–300 | 325 | 81.5 | 10.8 | 19.0 |
| 300–180 | 240 | 78.5 | 10.8 | 21.5 |
| 180–106 | 143 | 115.5 | 23.5 | 33.2 |
| 106–75 | 91 | 159.3 | 46.7 | 55.3 |
| 75–38 | 57 | 226.4 | 66.0 | 78.1 |

Example 8

A bismuth oxide powder was dry mixed, at a proportion of 100 ppm based on the weight of the resulting mixture, with each of the zinc alloy powder samples prepared in the same manner by using sieves as in Example 7 to prepare mixed zinc alloy powders.

The average gas evolution amount of the thus prepared mixed zinc alloy powder of each sample was measured in the same manner as in Example 7 except for the above change.

Obtained results are additionally shown in Table 2 and also by the graph shown in FIG. 4.

Comparative Example 2

Average amounts of gas evolution from zinc alloy powder samples prepared in the same classifying way by sieves as in Example 7 were measured in the same way as in Example 3 except that neither metallic bismuth powder nor bismuth oxide powder was added in this case.

Obtained results are additionally shown in Table 2 and also in a graph in FIG. 5.

From the test results of Examples 7 and 8 and Comparative Example 2 shown in Table 2, it is known that in either case of addition or non-addition of bismuth, the amount of gas evolution decreased as the particle size became larger. This result agrees with the fact that the specific surface area decreases as the particle size increases. It has been confirmed that, in the case of using zinc alloy powder, the amount of gas evolution remarkably decreases as compared with the case of using pure zinc powder even if no bismuth is added. It has also been confirmed that gas evolution is further suppressed by the addition of bismuth.

Example 9

A powder within the particle range of 38–850 $\mu$m of a zinc alloy having the composition consisting of 30 ppm Al, 80 ppm Bi, 500 ppm In and the balance of zinc was classified by the sieving into several powder samples. Each of the classified sample powders was dry mixed with a powder of metallic bismuth to obtain a mixed zinc alloy powder having a bismuth content of 600 ppm in the same manner as in Example 7. With respect to each of the samples of the resulting mixed zinc alloy powder the amount of gas evolution was measured to obtain the average value of the gas evolution in the same manner as in Example 3.

TABLE 3

| | Average | Average Gas Evolution Amounts ($\mu$l/g . day) Composition: Al 30-Bi 40-In 300 Zn (ppm) | | |
|---|---|---|---|---|
| Particle Size Ranges ($\mu$m) | Particle Sizes ($\mu$m) | Non-Addition (Comparative Example 3) | Bi Addition (Example 9) | Bi$_2$O$_3$ Addition (Example 10) |
| 850–710 | 780 | 6.7 | 5.2 | 5.5 |
| 710–600 | 655 | 8.8 | 4.7 | 8.7 |
| 600–500 | 550 | 10.5 | 5.6 | 10.0 |
| 500–425 | 463 | 17.2 | 7.3 | 13.6 |
| 425–350 | 363 | 26.3 | 15.7 | 17.9 |
| 350–300 | 325 | 29.6 | 15.5 | 14.3 |
| 300–180 | 240 | 27.8 | 8.9 | 11.7 |
| 180–106 | 143 | 58.7 | 24.3 | 21.1 |
| 106–75 | 91 | 98.7 | 55.3 | 47.6 |
| 75–38 | 57 | 154.7 | 80.9 | 63.2 |

Example 10

Classified zinc alloy powders prepared in the same manner as in Example 9 were dry mixed with a powder of bismuth oxide in the proportion of 100 ppm bismuth oxide in the resulting mixtured zinc alloy powders. With respect to each of the resulting zinc alloy powders, the average amount of gas evolution was measured in the same procedures as in Example 9. The results of the measurements are given in Table 3 and also in FIG. 4 by the graph.

Comparative Example 3

With respect to the samples of the zinc alloy powder obtained by sieving in the same manner as in Example 9, the average amount of gas evolution was measured in the same manner as in Example 9 except that neither a metallic bismuth powder nor a bismuth oxide powder was added in these cases.

The results of the measurements are shown in Table 3 and also in FIG. 5 by the graph.

From the results of Examples 9 and 10 and Comparative Example 3 shown in Table 3, the amount of gas evolution developed a tendency to decrease as the particle size became larger. This agrees with the fact that the specific surface area decreases as the particle size increases. It was also found that, in Examples 9 and 10 in which bismuth was added, there was a tendency for the amount of gas evolution to decrease and to be leveled off at a particle size of 200 $\mu$m or more.

Example 11

A zinc alloy powder having particle sizes in the range of 38 to 850 $\mu$m and having a composition consisting of 30 ppm Al, 125 ppm Bi, 500 ppm In and the rest of zinc was classified by the sieving into ten different samples of zinc alloy powder. Then, a metallic bismuth powder was dry mixed with each of the thus prepared samples in the proportion of 600 ppm to obtain mixed zinc alloy powders.

With respect to each of the samples of thus prepared mixed zinc alloy powder, the average amount of gas evolution was measured in the same way as in Example 3.

The obtained results are shown in Table 4 and also in FIG. 3 by the graph.

TABLE 4

| | Average | Average Gas Evolution Amounts ($\mu$l/g . day) Composition: Al 30-Bi 125-In 500 Zn (ppm) | | |
|---|---|---|---|---|
| Particle Size Ranges ($\mu$m) | Particle Sizes ($\mu$m) | Non-Addition (Comparative Example 2) | Bi Addition (Example 7) | Bi$_2$O$_3$ Addition (Example 8) |
| 850–710 | 780 | 4.7 | 2.2 | 6.2 |
| 710–600 | 655 | 2.5 | 2.0 | 5.7 |
| 600–500 | 550 | 5.3 | 3.2 | 8.3 |
| 500–425 | 463 | 8.0 | 3.7 | 9.2 |
| 425–350 | 363 | 7.0 | 5.5 | 12.1 |
| 350–300 | 325 | 16.3 | 4.8 | 8.5 |
| 300–180 | 240 | 10.1 | 4.0 | 7.7 |
| 180–106 | 143 | 19.2 | 8.0 | 9.5 |
| 106–75 | 91 | 40.0 | 18.7 | 18.9 |
| 75–38 | 57 | 102.3 | 31.8 | 33.1 |

Example 12

Each of the classified zinc alloy power samples prepared in the same sieving manner as in Example 11 was dry mixed with a powder of bismuth oxide in the proportion of 100 ppm bismuth oxide to obtain mixed zinc alloy powers. For each of the mixed zinc alloy powders thus obtained, the average amount of gas evolution was measured in the same manner as in Example 11.

The results of the measurements are shown in Table 4 and also in FIG. 4 by the graphic representation.

Comparative Example 4

For each of the classified zinc alloy powder samples prepared in the same manner as in Example 11 to which none of the metallic bismuth powder and the bismuth oxide powder was added, the average amount of gas evolution was measured in the same manner as in Example 11.

The results of the measurements are shown in Table 4 and also in FIG. 5 by the graphic representation.

It is known from the results of Examples 11 and 12 and Comparative Example 4 shown in Table 4 that the amount of hydrogen gas evolution decreases as the particle size becomes larger. This agrees with the fact that the specific surface area decreases as the particle size increases. It was confirmed from the results of Table 4, comparison between Tables 2 and 3, and also comparison among FIGS. 3, 4 and 5 that the effect of bismuth addition was more remarkable when bismuth was added to the zinc alloy powders containing Al, Bi and In, etc. than in the case when it was added to the powder of pure zinc.

The relationships between the amount of gas evolution before the addition of Bi (i.e., gas evolution at the time of non-addition of Bi) and the amount of gas evolution after the addition of Bi as set forth in Tables 1, 2, 3 and 4, are shown in FIGS. 6, 7, 8 and 9 by the graphic representation.

In either case, the linear relationship is observed to exist between the amounts of gas evolution before and after the addition of Bi (contributing ratio: $R^2=0.8759$).

From these results, it is understood that the effect of bismuth-coating is expected in any of the cases wherein a zinc powder having a particle size in the range of 10 to 1000 $\mu$m which is ordinarily employed as a cell powder is used. In other words, if bismuth is added to zinc powders in accordance with the method of the present invention, the rate of gas evolution from a zinc powder having the particle size in the range of 10 to 1000 $\mu$m can unexceptionally be decreased.

As explained hereinbefore in detail, an alkaline cell which is extremely reduced in the amount of hydrogen gas evolution can be provided by using the bismuth-coated zinc alloy powder whose average particle size is increased and therefore whose specific surface area is decreased according to the present invention. As regards a raw material powder to be coated with bismuth, a zinc alloy powder, particularly one which contains at least one element selected from the group consisting of Al, Bi and In is the most preferred because the gas evolution can be suppressed remarkably by using such a zinc alloy powder coated with bismuth.

Moreover, the bismuth-coated zinc powder can be easily prepared by dry mixing a zinc powder or a zinc alloy powder with a bismuth compound powder such as a metallic bismuth powder, a bismuth oxide powder or the like and then by immersing the thus prepared mixture in the alkaline electrolyte or the aqueous alkaline solution so that the negative electrode material, as well as the alkaline cell employing the same, can advantageously be provided at extremely low cost without difficulty.

It should be apparent to those skilled in the art that the present invention may be embodied in many other specific forms without departing from the spirit or scope of the invention. Therefore, the present examples, comparative examples and embodiments are to be considered as illustrative and not restrictive and the invention is not to be limited to the details given herein, but may be modified within the scope and equivalence of the appended claims.

What is claimed is:

1. A negative electrode material for use in an alkaline cell, the negative electrode material comprising bismuth-coated zinc powder particles which are prepared by coating surfaces of zinc powder particles with bismuth to uniformly distribute bismuth over the surfaces of the zinc powder particles, said coating being conducted in an aqueous alkaline solution which is free from a chlorine ion, a nitrate ion and a sulfate ion.

2. The negative electrode material for use in an alkaline cell according to claim 1, wherein said zinc powder is a zinc alloy powder.

3. The negative electrode material for use in an alkaline cell according to claim 2, wherein said zinc alloy powder comprises at least one member selected from the group consisting of Al, Bi and In.

4. The negative electrode material for use in an alkaline cell according to claim 1, wherein said bismuth-coated zinc powder particles have particle sizes in a range of 10 to 1000 $\mu$m.

5. In an alkaline cell comprising an alkaline electrolyte and a negative electrode material, the improvement comprising the negative electrode material being according to claim 1.

6. A method of preparing a negative electrode material for use in an alkaline cell according to claim 1 comprising preparing a bismuth-coated zinc powder by:
   dry mixing a zinc powder with a metallic bismuth powder in advance; and
   immersing the resultant mixture in an aqueous alkaline solution to deposit bismuth on surfaces of the zinc powder particles by displacement.

7. A method of preparing a negative electrode method for use in an alkaline cell according to claim 1 comprising preparing a bismuth-coated zinc powder by:
   dry mixing a zinc powder with a bismuth compound powder in advance; and
   immersing the resultant mixed powder in an aqueous alkaline solution to deposit bismuth on surfaces of the zinc powder particles by displacement.

8. The method of preparing a negative electrode material for use in an alkaline cell according to claim 7, wherein said bismuth compound powder comprises a bismuth oxide powder.

9. The method of preparing a negative electrode material for use in an alkaline cell according to claim 6, wherein said zinc powder comprises a zinc alloy powder.

10. The negative electrode material for use in an alkaline cell according to claim 2, wherein said bismuth-coated zinc powder particles have particle sizes in a range of 10 to 1000 $\mu$m.

11. The negative electrode material for use in an alkaline cell according to claim 3, wherein said bismuth-coated zinc powder particles have particle sizes in a range of 10 to 1000 $\mu$m.

12. In an alkaline cell comprising an alkaline electrolyte and a negative electrode material, the improvement comprising the negative electrode material being according to claim 2.

13. In an alkaline cell comprising an alkaline electrolyte and a negative electrode material, the improvement comprising the negative electrode material being according to claim 3.

14. In an alkaline cell comprising an alkaline electrolyte and a negative electrode material, the improvement comprising the negative electrode material being according to claim 4.

15. In an alkaline cell comprising an alkaline electrolyte and a negative electrode material, the improvement comprising the negative electrode material being according to claim 10.

16. In an alkaline cell comprising an alkaline electrolyte and a negative electrode material, the improvement comprising the negative electrode material being according to claim 11.

17. The method of preparing a negative electrode material for use in an alkaline cell according to claim 7, wherein said zinc powder comprises a zinc alloy powder.

18. The method of preparing a negative electrode material for use in an alkaline cell according to claim 8, wherein said zinc powder comprises a zinc alloy powder.

19. The negative electrode material for use in an alkaline cell according to claim 1, wherein said bismuth-coated zinc powder particles have particle sizes in a range of 850 to 710 $\mu$m.

20. The negative electrode material for use in an alkaline cell according to claim 1, wherein said bismuth-coated zinc powder particles have particle sizes in range of 710 to 600 $\mu$m.

21. The negative electrode material for use in an alkaline cell according to claim 1, wherein said bismuth-coated zinc powder particles have particle sizes in a range of 600 to 500 $\mu$m.

22. The negative electrode material for use in an alkaline cell according to claim 1, wherein said bismuth-coated zinc powder particles have particle sizes in a range of 500 to 425 $\mu$m.

23. The negative electrode material for use in an alkaline cell according to claim 1, wherein said bismuth-coated zinc powder particles have particle sizes in a range of 425 to 350 $\mu$m.

24. The negative electrode material for use in an alkaline cell according to claim 1, wherein said bismuth-coated zinc powder particles have particle sizes in a range of 350 to 300 $\mu$m.

25. The negative electrode material for use in an alkaline cell according to claim 1, wherein said bismuth-coated zinc powder particles have particle sizes in a range of 300 to 180 $\mu$m.

26. The negative electrode material for use in an alkaline cell according to claim 1, wherein said bismuth-coated zinc powder particles have particle sizes in a range of 180 to 106 $\mu$m.

27. In an alkaline cell comprising an alkaline electrolyte and a negative electrode material, the improvement comprising the negative electrode material being according to claim 19.

28. In an alkaline cell comprising an alkaline electrolyte and a negative electrode-material, the improvement comprising the negative electrode material being according to claim 20.

29. In alkaline cell comprising an alkaline electrolyte and a negative electrode material, the improvement comprising the negative electrode material being according to claim 21.

30. In an alkaline cell comprising an alkaline electrolyte and a negative electrode material, the improvement comprising the negative electrode material being according to claim 22.

31. In an alkaline cell comprising an alkaline electrolyte and a negative electrode material, the improvement comprising the negative electrode material being according to claim 23.

32. In an alkaline cell comprising an alkaline electrolyte and a negative electrode material, the improvement comprising the negative electrode material being according to claim 24.

33. In an alkaline cell comprising an alkaline electrolyte and a negative electrode material, the improvement comprising the negative electrode material being according to claim 25.

34. In an alkaline cell comprising an alkaline electrolyte and a negative electrode material, the improvement comprising the negative electrode material being according to claim 26.

\* \* \* \* \*